2,702,747

NONCAKING FERTILIZERS

Merton L. Studebaker, Bartlesville, Okla., assignor to Phillips Petroleum Company, a corporation of Delaware No Drawing. Application August 27, 1951,
Serial No. 243,911

5 Claims. (Cl. 71—64)

This invention relates to fertilizers and to a novel process for coating fertilizers. In one of its more particular aspects this invention relates to fertilizers which have less tendency to cake during handling and storage than fertilizers presently available.

In the manufacture of ammonium nitrate and ammonium sulfate fertilizers ammonia gas is usually passed into nitric acid or sulfuric acid, and the resulting solution is evaporated. However because of its highly hydroscopic nature ammonium nitrate cannot be used for the dry mixing of fertilizers. Ammonium sulfate for the same reason cannot easily be handled. As a result of considerable study which has been carried out attempts have been made to coat ammonium nitrate or ammonium sulfate granules to retard or prevent their hydroscopic tendencies. Ammonium nitrate has been coated with resins, paraffins and clays to form prills which have less caking tendencies. Investigations on coating agents for ammonium nitrate have been fairly extensive, and so far the most practical commercial coating agents which have been found are the diatomaceous earths.

The present preferred practice in the ammonium nitrate industry is to coat the dried, prilled material with three to five per cent of diatomaceous earth. Some diatomaceous earths have proven to be more effective than others, and their effectiveness appears to be directly proportional to their ability to absorb the concentrated ammonium nitrate solution as it is formed on the surface of the ammonium nitrate during periods of high relative humidity. Coating processes are not entirely satisfactory because large amounts of the coating material must be used, thereby making the process uneconomical because of the lower nitrogen content of the mixture. In addition, since the coating materials are not entirely effective in preventing caking of the prills, the prills must be stored in moisture proof bags.

An object of this invention is to provide a process for coating fertilizers so that caking will not occur.

Another object of this invention is to provide a fertilizer having a coating which protects the fertilizer from moisture in the atmosphere apparently by creating a moisture barrier.

Still another object of this invention is to provide a novel parting agent for ammonium nitrate and ammonium sulfate fertilizers.

Other objects and advantages of this invention will become apparent to one skilled in the art from the accompanying disclosure and discussion.

This invention, in one of its primary phases, relates to a process for preparing fertilizers by coating ammonium nitrate or ammonium sulfate with a clay mineral rendered hydrophobic by base-exchange, said clay mineral originally exhibiting a substantial base-exchange capacity. Ordinarily prills having substantially all of the moisture removed are passed into a tumbler containing the clay and are tumbled with a sufficient amount of the coating agent to coat the prill. The organophilic clays disclosed herein are similarly employed, the prills being tumbled until a protective coating is formed thereon. Whether the coat is sufficiently thick to prevent the caking tendency can be readily determined by simple testing. In general, at least about one per cent by weight is sufficient, although larger amounts, say around 3.5 per cent by weight or more will normally be employed. Even larger quantities could, of course, be used, but it would not be economically desirable to employ such amounts. The particles coated are of such size that at least 96 per cent of the coated prills pass through an 8 mesh screen, not over about 3 per cent pass through a 35 mesh screen, and not over 1 per cent of the coated prills pass through a 100 mesh screen. We believe that the prills prepared according to this invention are protected from moisture in the air by the creation of a moisture barrier.

It has been recently shown that clay minerals exhibiting base-exchange properties can be chemically combined with organic compounds indicated hereinafter and thus rendered hydrophobic.

Of the methods for rendering such clays hydrophobic by base-exchange the most convenient is the reaction of organic bases, e. g. amines, with clays exhibiting base-exchange properties. Other bases are onium bases, for examples phosponium, sulfonium, arsonium, stibonium, oxonium, and telluronium bases having at least ten carbon atoms. Thus when a clay exhibiting base-exchange properties, for example bentonite, is reacted with an amine or an amine salt the resulting product is organophilic. Since the clay must also be hydrophobic it is preferred also that the amine have at least ten carbon atoms. When the amine is reacted with the clay, primary or secondary amines can be used. If the ammonium base is employed tertiary amines are also applicable. Suitable amines having ten or more carbon atoms are decylamine, dodecylamine, undecylamine, didecylamine, hexadecylamine, octadecylamine, dioctylamine, undecenylamine, dodecenylamine, hexadecenylamine, and the like. The ratio of amine added to clay can be varied over wide limits. In the case of bentonite 100 milliequivalents of the amine or amine salt to 100 grams of clay are used.

Organophilic clays can also be prepared by contacting a clay exhibiting base-exchange properties with a solution of a salt, capable of forming a water-insoluble basic salt upon being heated, the cation of which is of such size that it cannot enter into the crystal lattice of the hydrous oxide, and the anion of which contains a chain of from one to six carbon atoms. For colloidal crystalline inorganic hydrous oxides whose individual crystallites exhibit at least one surface plane in the form of a silica sheet having hexagonal voids with an inscribed circle of about 2.6 angstroms, suitable cations are those of lead, potassium, barium and ammonium, and suitable anions are those of fatty acids containing up to six carbon atoms. Specific examples of these salts are lead formate, lead acetate, and the like. Polymerizable anions can also be used.

In another method, cations of such size that they cannot enter the crystal lattice are also used in forming organophilic, and hydrophobic clays by base-exchange. Using bentonite as an example if the sodium ions in bentonite are replaced by base-exchange reaction with a potassium salt, potassium ions, having an apparent diameter of 2.66 angstroms, even when dry, cannot penetrate the voids in the silicon-oxygen sheet of the clay. This new clay salt which has the potassium ion held weakly in position can then be reacted with an organic halide to render the clay hydrophobic. Thus a potassium bentonite formed by base-exchange can be reacted with octyl iodide.

The methods described herein for preparing organophilic clays do not constitute our invention but are disclosed in Colloid Chemistry, Alexander, vol. VII, 1950, by Ernest A. Hauser, page 431 et seq. In general the methods for preparing organophilic clays are ion exchange reactions. The ions of the clay particle can be exchanged with ions from a dispersion medium. It is understood that any of the methods noted therein are within the scope of this invention. Further it is emphasized that there is a difference between a simple mechanical mixture of a clay with an organic compound, and the chemical bonding obtained by the methods disclosed hereinbefore.

The clays which are useful as starting materials in accordance with this invention are those exhibiting substantial base-exchange properties, and particularly those exhibiting comparatively high base-exchange properties and containing cations capable of more or less easy replacement. The clays particularly contemplated include the montmorillonites, for example, Wyoming bentonite, magnesium bentonite (sometimes called hectorite) and saponite. Also nontronite, attapulgite, illite, zeolites, and fuller's earths, particularly those of the Georgia-Florida type are contemplated. The base-exchange capacities of the various clays enumerated run from about 15 to about 100, based upon milliequivalents of exchangeable base per 100 grams of clay.

Since by the reaction of clay minerals, e. g. bentonite, and organic bases, especially amines having at least ten carbon atoms, and their salts, an organophilic clay results which is not only hydrophobic but capable of behaving in organic liquids like the natural clay in water, the parting agent of this invention does not depend on absorbing the ammonium nitrate solution formed on the prills in moist atmospheres, but protects the prilled ammonium nitrate from the moisture in the moist atmosphere, it is believed, by creating an effective moisture barrier. Whereas an adsorbent clay or diatomaceous earth offers comparatively little resistance to the passage of moisture vapor, an organophilic clay of the type disclosed herein will only permit the transfer of moisture from the atmosphere to the prill if the moisture vapor pressure of the atmosphere is great enough to overcome the pressure drop across the capillary spaces of the moisture barrier. By building up a layer of the organophilic material to above a certain critical thickness comparatively little transfer of moisture between the prill and the atmosphere will be encountered.

In order to test fertilizers coated with parting agents prepared by base-exchanging clay minerals with organic compounds a series of tests was devised. In preparing the samples, the ammonium nitrate prills were screened to the desired size, and the moisture was adjusted to the appropriate level either by drying in a vacuum oven at 50° C. (122° F.) and 10 mm. mercury or by exposing the sample to a 100 per cent relative humidity. To exclude air a desiccator at room temperature was used as the humidity cabinet. Any adjustment in moisture content of the conditioning agent was made by drying at 105° C. (221° F.) or by exposing the agent to a 100 per cent relative humidity. The fertilizer was coated with conditioning agent by placing 305 grams fertilizer in a one quart, round, glass bottle (3¼ inches diameter and 7 inches high) with the desired amount of conditioning agent, and rolling at 100 R. P. M. for 25 minutes.

Evaluation of the samples consisted of putting the coated samples in containers comprising thin walled tubes of two inch length and two inch inside diameter. Each tube rested on a four inch square flat Lucite plate with one open end of said tube against the plate, and the other open end of the tube up. The interior of the tubing was lined with waxed paper to prevent sticking of the fertilizer. Pressure on the fertilizer was obtained by the weight on the fertilizer of a steel rod of two inch diameter which fits into the tube and rests on the fertilizer. Each steel rod was 43.2 inches long with the end against the sample machined flat. To simulate bag storage, each sample and its container, including the Lucite plate, was enclosed in a flexible polyethylene bag with the ends of the bag secured tightly around the steel rod. In the temperature controlled humidity cabinets, equipped with blowers to provide air circulation, samples of seventy-five grams samples of fertilizer were tested under 12 p. s. i. g. pressure for six days. The temperature and relative humidity were maintained at 100° F. and 40 per cent, and 80° F. with 75 per cent relative humidity for alternate 24 hour periods. The cakes formed were then removed, dried for two days at 50° C. (122° F.) and their crushing strengths determined in a Carver laboratory press. Relative crushing strengths were used as a direct measure of caking tendency.

Ammonium nitrate prills tested were prepared by coating ammonium nitrate with a commercial diatomaceous earth, (Dicalite 109–3), and an organophilic clay (Bentone 18) of the type disclosed herein, i. e. an alkyl ammonium bentonite in which the alkyl radical had, on the average, about eighteen carbon atoms. In my organophilic clay (Bentone 18) the clay was chemically combined with the organic compound.

The tests below were conducted in quadruplicate and averages are reported. Control tests in which untreated Dicalite 109–3, which is a very effective coating agent in commercial use, was used as a conditioning agent were conducted concurrently with the evaluation tests. The efficiency of each material in preventing caking as compared to untreated Dicalite 109–3 was calculated by dividing the average crushing strength of cakes containing the material into the average crushing strength of cakes containing untreated Dicalite and multiplying the results by 100. The efficiency determination is necessary because the variables in each case, for example, humidity etc. prevents direct comparison of crushing strength.

Table

| Conditioning Agent | Percent Agent on Prills | Moisture in Agent (Percent) | Average Crushing Strength, p. s. i. g. on Cakes | Efficiency as Conditioning Agent (Based on Untreated Dicalite=100) |
|---|---|---|---|---|
| Bentone 18 | 3.5 | 2.6 | 0 | (infinite) |
| Bentone 18 | 1.5 | 2.6 | 0 | (infinite) |
| Dicalite 109–3 | 3.5 | 3.5 | 98 | 100 |

The percentages indicated in the above table are weight percentages. The conditioning agents were evaluated on one-two-millimeter diameter prills containing 0.29 per cent moisture.

The above table clearly shows the notable improvement of fertilizer prills of my invention with respect to caking. Neither of the samples coated with bentone 18 formed a cake while the cake formed by the sample coated with 3.5 per cent Dicalite 109–3 formed a cake crushing under a pressure of 98 p. s. i. g. The above tests show that the fertilizer prills prepared in accordance with this invention, with the clay and the organic compound chemically combined, are much superior to fertilizers coated with coating diatomaceous earths used commercially. In addition I have found that prills coated according to my invention have less caking tendencies than even the most effective parting agent which we have found, which is not used commercially, that is, a hydrophobic clay which was a kaolin-type clay containing 1 per cent stearic acid as determined by extraction. This clay is not chemically combined with the organic material but is in admixture therewith.

Thus improved non-caking fertilizers are prepared by coating ammonium nitrate or ammonium sulfate granules with a clay mineral originally exhibiting a substantial base-exchange capacity, said clay mineral having been chemically combined with a hydrophobic organic radical. In addition smaller amounts of the parting material than usually employed can be effectively used, resulting in fertilizer having superior non-caking properties.

Obviously many modifications or variations as hereinbefore set forth may be made without departing from the spirit and scope of this invention.

I claim:

1. The method of making a fertilizer which comprises reacting a bentonite with an amine having at least 10 carbon atoms to provide a layer of organophilic, hydrophobic material upon the surface of the bentonite particle, and applying the thus reacted bentonite as a coating to a core of hygroscopic fertilizer material.

2. A process for preparing a fertilizer which comprises reacting a clay mineral having a base exchange capacity of from 15 to 100 milliequivalents of exchangeable base per 100 grams of clay mineral with an organic base selected from the group consisting of amines and onium bases having at least 10 carbon atoms, thereby to form an outer layer of organophilic, hydrophobic material upon the surface of the clay mineral, and coating a core of hygroscopic fertilizer material with the thus reacted clay mineral.

3. A process for preparing a fertilizer which comprises reacting a bentonite with a primary amine having at least ten carbon atoms to provide an outer layer of organophilic, hydrophobic material on the bentonite, and applying the thus treated bentonite as a coating to a core of hygroscopic fertilizer material.

4. The process of claim 3 in which the fertilizer material is ammonium nitrate.

5. A fertilizer composition comprising a core of hygroscopic fertilizer material and a coating formed from particles of a bentonite clay surrounding and adhering to said core, said clay particles having a base exchange capacity of from 15 to 100 milliequivalents of exchangeable base per 100 grams of clay and having an outer layer of an organophilic, hydrophobic material preventing transfer of moisture between the atmosphere and the fertilizer material, said outer layer being formed by base exchange reaction between said clay particles and an organic base selected from the group consisting of amines and onium bases having at least 10 carbon atoms.

References Cited in the file of this patent

UNITED STATES PATENTS

| | | |
|---|---|---|
| 2,399,987 | Cordie et al. | May 7, 1946 |
| 2,523,204 | Feustel | Sept. 19, 1950 |
| 2,523,420 | Burrage | Sept. 26, 1950 |
| 2,531,396 | Carter | Nov. 28, 1950 |
| 2,539,012 | Diamond | Jan. 23, 1951 |
| 2,559,398 | Capell | July 3, 1951 |